Aug. 19, 1930.  G. A. SMITH  1,773,323
MEANS FOR APPLYING SOLDER TO CAN CAPS
Filed May 8, 1929  2 Sheets-Sheet 1
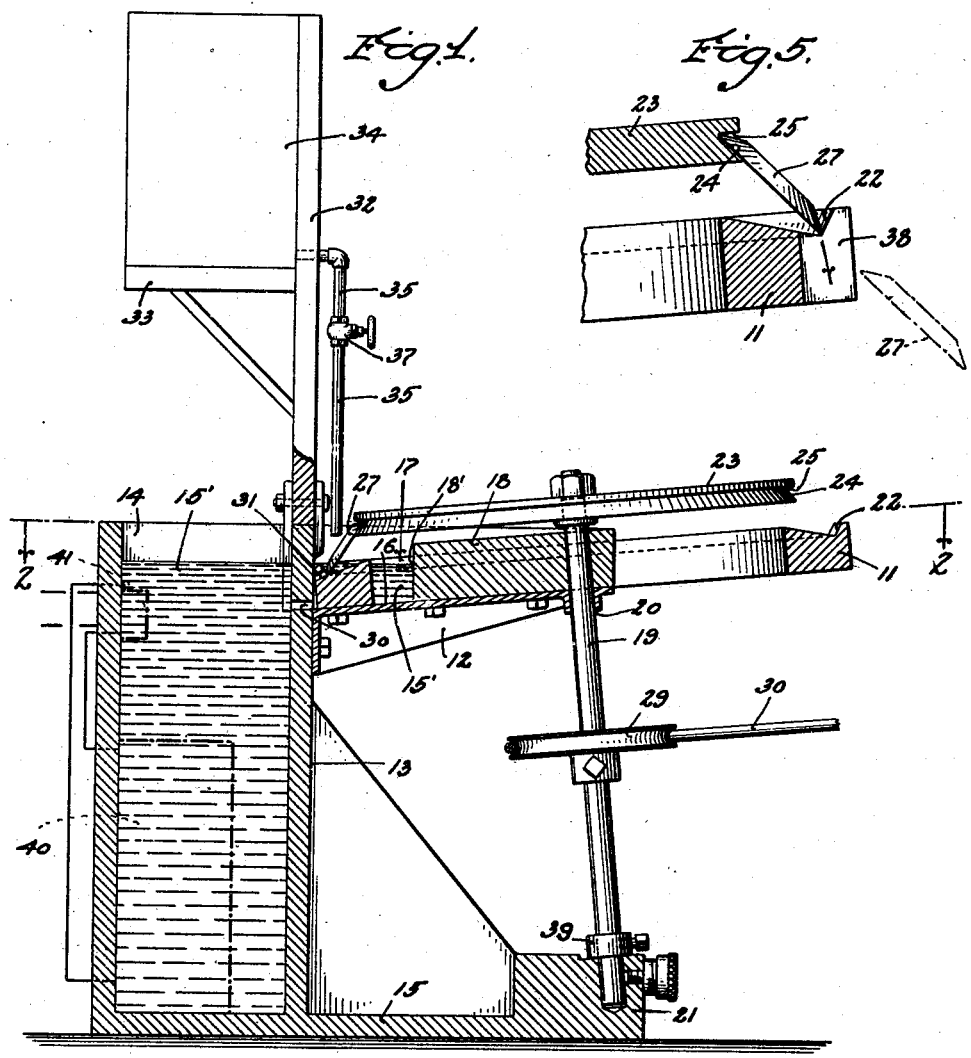
INVENTOR
By GLENN A. SMITH
ATTORNEY.

Aug. 19, 1930.  G. A. SMITH  1,773,323
MEANS FOR APPLYING SOLDER TO CAN CAPS
Filed May 8, 1929   2 Sheets-Sheet 2
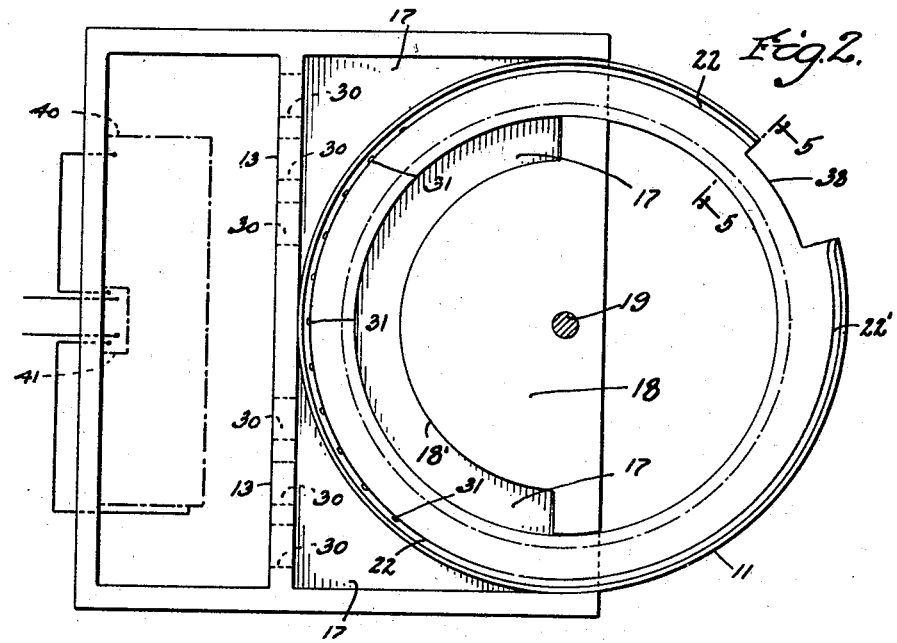
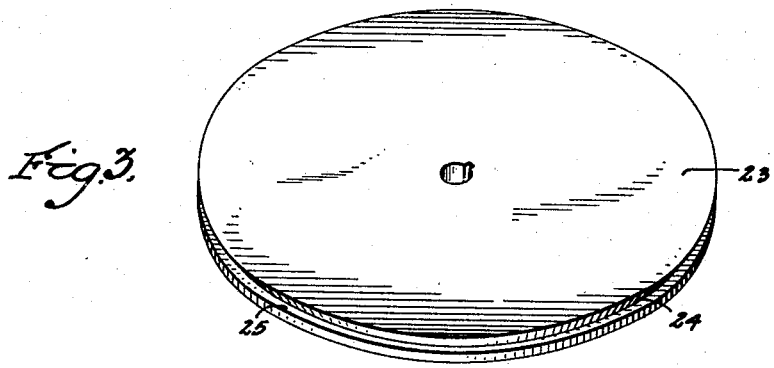
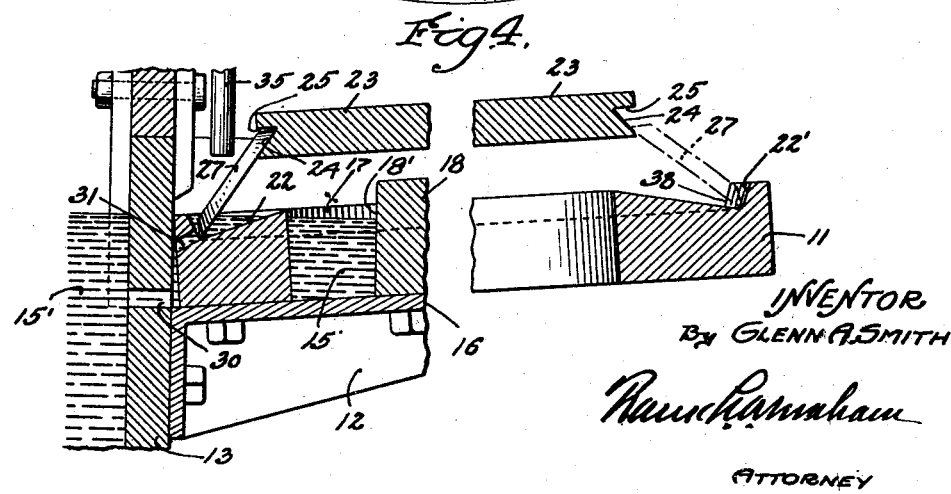
INVENTOR
By GLENN A. SMITH
ATTORNEY Patented Aug. 19, 1930

1,773,323

UNITED STATES PATENT OFFICE

GLENN A. SMITH, OF LOS ANGELES, CALIFORNIA

MEANS FOR APPLYING SOLDER TO CAN CAPS

Application filed May 8, 1929. Serial No. 361,284.

This invention relates to a machine which is especially adapted for use in providing a coating of solder to the periphery of circular metal discs such as can caps or the like.

The particular machine which forms the subject matter in this application has been produced especially for the purpose of applying solder to the small metal caps which are used on liquid containers such as are ordinarily used in the retail dispensation of oil and the like.

Ordinarily these caps are attached to the openings in the cans by placing them over the opening in engagement with the can and applying solder to the edge of the cap manually in the well known manner. In the practice of my invention, the caps are tinned with a rim of solder and flux, so that the only operation necessary in attaching them to the can is the application of a heated member such as a soldering iron to the rim of the can cap.

The chief advantages derived from my invention over the manual method of soldering are that the quantity of solder deposited upon the caps may be predetermined; the caps are uniformly soldered, preventing leaks which are apt to occur in the manual method; and there is sufficient flux deposited on the edge of the cap so that the attachment of a cap prepared by my method may be effected much more rapidly than in the practice of the manual method.

My invention has a further advantage in that the quantity of solder required is much less than that ordinarily used, due to the fact that all waste is eliminated. I have found in the practice of my invention that the standard one and three-quarters inch (1¾") studhole caps, such as are used on five gallon cans, will require a quantity of solder not to exceed two and one-half (2½) pounds per thousand caps, whereas the ordinary manual method of applying the solder requires on the average from six to eight pounds of solder per one thousand caps.

It is a primary object of my invention to produce a machine of the class described which is of simple form and construction and by means of which a disk may be provided with a peripheral coating by rolling or progressively rotating the disk in an inclined position by means of a circular rotor on a circular channeled track which contains the coating material. By rolling the disks through the solder in an inclined position, the greatest quantity of solder is deposited upon that portion of the disk periphery where it is most needed, and there is no waste solder deposited where it is not needed, as would be the case if the caps were rolled in a vertical position.

It is a further object of my invention to produce a machine of the class described, which may be adjusted to accommodate disks of various diameters and which is more or less automatic in its operation. The only manual performance required in the operation of my invention resides in the placement of the disks in the machine, and it is entirely possible that mechanical means could be employed for effecting this step.

It is a noteworthy feature of my invention that the quantity of solder applied to the periphery of can caps may be governed by the temperature of solder, it being understood that within certain limits the higher the temperature the smaller the quantity of solder which will adhere to the periphery of the disk.

It is also a feature of note in my invention that all of the cap contacting parts may be made of cast iron or some similar material to which the solder will not adhere, also that there are no belts or chains with which the caps must come in contact.

It is also an object of my invention to produce a machine of the class described in which a flux may be applied to the periphery of the disk during the application of the solder coating.

Other advantageous features of my invention and further objects attending its production will be better understood from the following description of the accompanying drawings, which are chosen for illustrative purposes only, and in which Fig. 1 is an elevational view, partly in section, showing a preferred form of my invention.

Fig. 2 is a plan section which may be considered as having been taken substantially in a plane represented by the line 2—2 in Fig. 1.

Fig. 3 is a perspective view showing the lower surface of a rotor which forms a part of the machine shown in Fig. 1.

Fig. 4 is an enlarged partial sectional elevation, showing details in the construction of a table and a rotor embodied in a preferred form of my invention.

Fig. 5 is an enlarged partial sectional elevation which may be considered as having been taken substantially in a plane represented by the line 5—5 in Fig. 2.

More particularly describing the invention as herein illustrated, reference numeral 11 indicates a sloping disk supporting ring or track which, for the purpose of definition, will be hereinafter referred to as a sloping table or trough member.

The table 11 is mounted upon shelf 16 which may be cast integrally with an upright member 13, but which is illustrated as being attached thereto.

The upright member 13 in the form of my invention illustrated in the drawings is a part of a solder receptacle 14 which is mounted upon a base member 15.

The bracket 12 has said shelf 16 formed upon its upper surface, such shelf forming the bottom of a pan or solder receptacle 17, which encompasses the lower portion of the sloping track or table 11.

A plate 18 is shown as being mounted upon the upper surface of the shelf 16, so that the side 18' thereof forms an outer edge or partition in the pan 17.

It is to be understood that the plate 18 may be made as a solid section case integrally with the bottom 16.

A rotatable shaft 19 extends through a bearing passage 20 in the shelf 17 and the plate or solid section 18, the lower end of the shaft 19 being received by a suitable bearing member 21, which is illustrated as being formed upon the base 15.

The upper surface of the table 11 is provided with an annular channel 22, and a rotor 23 is mounted upon the shaft 19 above the table 11, and is so positioned as to be concentric with the area circumscribed by the channel 22.

The rotor 23 is provided with a peripheral groove 24, forming an annular shoulder 25, and the rotor is mounted upon the shaft 19 in a manner such that the groove 24 is held in a predetermined spaced relation with the annular channel 22, so that the shoulder 24 and the channel 22 cooperate to support a disk 27 in an inclined position.

The rotor 23 is adapted to receive rotation from the shaft 19 through the medium of a pulley 29 which is adapted to be driven by a belt 30 from any suitable source of power (not shown), and it will be understood that when the rotor is revolved upon its axis, a disk 27 positioned between the shoulder 25 and the channeled track 22 will be rotated around the track in an inclined position.

In the form of my invention illustrated in the drawings, the solder receptacle 14 is adapted to be filled with solder, as indicated at 15', and the wall 13 of the solder receptacle is provided with an aperture or apertures 30 which admit the passage of solder into the pan 17 which encompasses the lower portion of the table or ring 11.

The ring 11 is provided with a series of passages 31 through which solder passes to the lower portion of the channel 24 so that a disk which is rolled about the channeled track passes through the solder in the manner indicated in Fig. 1. Such operation is effective to provide the entire periphery of the disk with a coating of solder, and the solder receptacle is so positioned relative to the channeled track that the solder on the disk has an opportunity to solidify on the cap before the cap is discharged from the track.

For the purpose of delivering flux to the periphery of the disk during the soldering operation, I show the standard 13 as being provided with an upper extension 32, which carries a shelf 33 adapted to support a flux tank 34.

A flux delivery tube 35 is mounted in the bottom of the tank 34, and has its outlet positioned in a manner such that flux is delivered into the lower portion of the channel 22.

The quantity of flux may be controlled by means of the valve 37.

In order that the disks or can caps 27 may be conveniently positioned between the rotor and the channeled track 22, I show a section 22' of the track as being offset in the manner illustrated in Figs. 2 and 4, so that the space between the section 22' of the track 22 and the shoulder 25 is of sufficient width to admit the reception of can caps at one point, this space gradually becoming narrower so that the disks or can caps 27 are held firmly between the shoulder and the channel throughout the remainder of the course.

In order that the disks or can caps may be automatically discharged from the machine at the completion of the soldering operation, I show the table as being provided with a notched section 38, which extends across the channeled track 25, as indicated in Figs. 2 and 5.

The rotor 23 is adjustable with respect to the table 11 through the medium of an adjustment collar 39, mounted upon the shaft 19. This adjustment makes possible the use of one machine with disks of various sizes.

The solder tank 14 may be provided with any suitable heating device, such as the electric heater generally indicated by reference numeral 40, and the temperature of the solder may be controlled by means of a thermostat 41, it being understood, as has been hereinbefore pointed out, that the quantity of solder applied to the periphery of the disk or cap may be governed by controlling the temperature of the solder in the channel.

It will be apparent from the foregoing description that my invention embodies a machine for applying a tinned coating to the periphery of a disk, which consists of two superposed disk supporting members 11 and 23, which are provided with corresponding grooves 22 and 24 respectively, so positioned as to admit the reception of a disk 27 and arranged so that the rotation of one of the members (the rotor 23) is effective to roll or progressively rotate the disk in an inclined position through a coating material (the solder and flux) and thereby coat the periphery of the disk with this material.

It will be understood that, while I have herein described and illustrated one preferred embodiment of my invention, the invention is not limited to the precise construction set forth, but includes within its scope whatever changes fairly come within the spirit of the appended claims.

I claim as my invention:

1. For use in coating the periphery of a disk, a machine embodying: a table having an annular disk supporting channel in its upper surface; a rotor having a peripheral shoulder adapted to engage the edge of a disk supported in said channel; means for rotatably supporting said rotor above said table; and means for delivering a coating material into said channel.

2. For use in coating the periphery of a disk, a machine embodying: a table having an annular disk supporting channel in its upper surface; a rotor having a peripheral shoulder adapted to engage the edge of a disk supported in said channel; means for rotatably supporting said rotor above said table in substantially coaxial relation with the area circumscribed by said annular channel; and means for delivering a coating material to a section of said channel, a part of said channel being offset to admit the reception of a disk between said channel and the shoulder on said rotor.

3. For use in coating the periphery of a disk, a machine embodying: a table having an annular disk supporting channel in its upper surface; a rotor having a peripheral shoulder adapted to engage the edge of a disk supported in said channel; means for rotatably supporting said rotor above said table in substantially coaxial relation with the area circumscribed by said annular channel; and means for delivering a coating material to a section of said channel, said table being provided with a notch extending across said channel and positioned so as to permit the automatic egress of a disk from said channel after it has passed through said coating material.

4. For use in coating the periphery of a disk, a machine embodying: a sloping table having an annular channel in its upper surface; a shaft extending coaxially through the area circumscribed by said channel; a rotor on said shaft having a peripheral shoulder above said channel; and means for rotating said rotor.

5. For use in coating the periphery of a disk, a machine embodying: a sloping table having an annular channel in its upper surface; a shaft extending coaxially through the area circumscribed by said channel; a rotor on said shaft having a peripheral shoulder above said channel; means for rotating said rotor; and a pan enclosing the lower portion of said sloping table and adapted to receive a coating material.

6. For use in coating the periphery of a disk, a machine embodying: a sloping table having an annular channel in its upper surface; a shaft extending coaxially through the area circumscribed by said channel; a rotor on said shaft having a peripheral shoulder above said channel; means for rotating said rotor; and a pan enclosing the lower portion of said sloping table and adapted to receive a coating material, said table being provided with passages extending into said channel to admit coating material from said pan into said channel.

7. A machine for applying solder to the periphery of a circular can cap embodying: a solder receptacle; a sloping table positioned with its lowest portion adjacent to said receptacle; said table having an annular groove formed in its upper surface; means for delivering solder from said receptacle to said annular groove; a rotor above said table having a peripheral shoulder in predetermined spaced relation with said annular groove; and means for supporting and rotating said rotor.

8. A machine for applying solder to the periphery of a circular can cap embodying: a solder receptacle; a sloping table in the form of a ring positioned with its lowest portion adjacent said receptacle; a pan associated with said receptacle encompassing the lower portion of said ring, said ring having an annular groove in its upper surface; a rotor above said table having a peripheral shoulder in predetermined spaced relation with said annular groove; and means for supporting and rotating said rotor.

9. A machine for coating the periphery of a disk embodying: two superposed disk supporting members, each having an annular disk engaging groove formed therein; means for holding said supporting members so that the disk engaging grooves bear a predetermined spaced relation with each other; means for delivering a coating material into a section of the groove in the lower member; and means for rotating one of said members.

10. A machine for coating the periphery of a disk embodying: two superposed disk supporting members, each having an annular disk engaging groove formed therein; means for holding said supporting members so that the disk engaging grooves bear a predetermined spaced relation with each other; means for delivering a coating material into a section of the groove in the lower member; means for permitting adjustable variation of the distance between said members; and means for rotating one of said members.

In testimony whereof, I have hereunto set my hand at Los Angeles, California, this 29th day of April, 1929.

GLENN A. SMITH.